United States Patent Office 2,772,266
Patented Nov. 27, 1956

2,772,266

METHOD OF PREPARING CELLULOSE ACETATE

Carl J. Malm and Loring W. Blanchard, Jr., Rochester, N. Y., assignors to Eastman Kodak Company, Rochester, N. Y., a corporation of New Jersey No Drawing. Application August 30, 1952,
Serial No. 307,392

3 Claims. (Cl. 260—227)

The present invention relates to the preparation of cellulose acetate in which the cellulose is esterified in 2 steps, in the first of which the cellulose is substantially completely esterified, and in the second of which sulfuric acid is added to prevent gelation of the cellulose acetate in the esterification mass.

In the manufacture of cellulose acetate of high or medium viscosity in which sulfuric acid is employed as the catalyst and acetic acid as the solvent in the esterification, there is always a tendency towards gelation of cellulose acetate in the acetylation mixture towards the end of the reaction. This gelation of the cellulose acetate, which is usually only partial in nature, detrimentally affects the filterability properties of the cellulose acetate and also the solubility of the final product obtained therefrom. This tendency of the cellulose acetate to gel near the end of the acetylation appears to be due to the insolubility in glacial acetic acid of fully acetylated cellulose of good viscosity. Two methods have been previously recognized for overcoming this tendency to gel, namely, 1) the use of a large excess of acetic anhydride in the esterification, or 2) the use of a large quantity of sulfuric acid catalyst in the esterification. The first method is effective by virtue of the fact that acetic acid containing more than 10% acetic anhydride is a much better solvent for cellulose triacetate than acetic acid containing less than 10% of the anhydride. However, the use of a large excess of acetic anhydride in the esterification process adds considerably to the cost of preparing the cellulose acetate. The second method referred to is effective by virtue of the fact that upon use of an increased quantity of sulfuric acid, cellulose acetate sulfate forms, which is much more soluble in acetic acid than cellulose triacetate, the solubility increasing with the amount of combined sulfur in the ester. However, this use of a large quantity of sulfuric acid in the esterification has the disadvantage that it speeds up the esterification, and in the case of large-scale operations the acetylation is difficult, or even impossible, to control.

One object of our invention is to provide a method of preparing cellulose acetate in which gelation of the cellulose acetate in the acetylation mass is avoided. Another object of our invention is to provide a method for preparing cellulose acetate without danger of gelation in which normal amounts of acetic anhydride may be employed. A still further object of our invention is to provide a process for the preparation of cellulose acetate in which excessive amounts of sulfuric acid need not be present during the major portion of the esterification. A still further object of our invention is to provide a two-step acetylation method for preparing cellulose acetate. Other objects of our invention will appear herein.

We have found that the tendency which has previously been exhibited by fully acetylated cellulose in the preparation thereof to gel in the acetylation mass can be conveniently avoided by first carrying out the acetylation with a normal amount of acetic anhydride and a sufficiently low quantity of sulfuric acid that the reaction can be easily controlled, and near the end of the esterification adding thereto an additional amount of sulfuric acid. At this stage in the acetylation, the reaction is well under control, and no difficulty arises in that respect. Without the addition of sulfuric acid at this point using normal acetic anhydride and low sulfuric acid, a considerable decrease in the amount of the combined sulfur in the cellulose acetate takes place because of a transesterification, i. e., the introduction of acetyl to the cellulose acetate to replace the combined sulfuric acid therein. On the other hand, by our invention the transesterification is markedly retarded at this point, allowing the esterification of the cellulose to be completed while there is still a sufficient amount of combined sulfuric acid in the cellulose acetate to make the ester soluble in acetic acid, and thereby preventing gelation thereof. At this point the esterification of the cellulose has slowed down due, in part, to the combination of some of the catalyst with the cellulose. By the addition of sulfuric acid at this point, catalyst is provided for the unesterified fibers which speeds up their esterification. At the end of the esterification, magnesium acetate in solution in aqueous acetic acid is added to the mass this addition to the acetylation mass ordinarily being that which initiates the hydrolysis of the cellulose acetate. The amount of magnesium acetate added is substantially that which will neutralize the additional sulfuric acid which was added to the acetylation mass in the second step. As a result, a cellulose acetate is obtained which does not contain any more combined sulfuric acid than will assure good stability of the cellulose acetate.

Our invention relates to the manufacture of cellulose acetates having good viscosity, such as are prepared in acetylation processes the peak temperatures of which do not exceed 80–120° F., thus avoiding substantial breakdown of the cellulose. In terms of viscosity, the esters with which our invention is concerned are those which have a 2.5% cuprammonium viscosity at 25° C. of at least 10 cps. The cuprammonium viscosities of the usual types of cellulose acetate is ordinarily found within the range of 10–40 cps., and our invention is particularly concerned with the higher viscosity cellulose acetates, such as those having a cuprammonium viscosity of 15–40 cps. or more.

Our invention is adapted for use in the manufacture of cellulose acetate in which the amount of sulfuric acid employed is within the range of 2.5–8%, based on the cellulose in the initial portion of the esterification. Upon the second addition of sulfuric acid, the amount introduced should be from ½ to 1½ times the amount of sulfuric acid used in the first step for the principal esterification. This additional sulfuric acid is conveniently added in the form of its solution in acetic acid; for example, the sulfuric acid may be added diluted with an equal weight of acetic acid directly to the well-agitated reaction mass. In the manufacture of cellulose acetate ordinarily the mass starts out at a low temperature, such as 60–70° F., and as the reaction proceeds, the temperature rises to a peak, such as 80–120° F. The second addition of sulfuric acid is made either when the reaction temperature has reached its peak or immediately prior thereto, such as within no more than 5 or 10 degrees of the attainment of the peak temperature in the acetylation process. Various acetylation methods may vary as to the starting temperature and as to the range over which the acetylation temperature rises, but we have found that the peak temperature in procedures in accordance with our invention should be restricted to those within the range of 80-120° F., 100° F. being a convenient peak temperature to employ. When the second addition of sulfuric acid catalyst is made at or near this peak point, the unesterified material present is not sufficient to cause violence of reaction, and hence the acetylation remains under control.

After the cellulose acetate is prepared, it is conveniently hydrolyzed to acetone solubility, such as by adding sufficient aqueous acetic acid to the mass to destroy the anhydride and to reduce the concentration of the acetic acid therein to about 70–95%. As pointed out above, also included in this addition of aqueous acetic acid is a magnesium salt of a weak acid or magnesia itself (which forms magnesium acetate in the acetic acid) in an amount only sufficient to substantially neutralize the amount of sulfuric acid which was added in the second step in the acetylation procedure. After this addition, the mass is allowed to stand for a time, thereby removing the combined sulfate from the cellulose ester and reducing the acetyl content thereof, such as to an acetyl content of 38–41.5%. This hydrolysis may be conveniently carried out at a temperature of 100–110° F., the time required for the hydrolysis varying with the sulfuric acid content of the hydrolysis bath.

The following example illustrates the acetylation of cellulose in accordance with our invention:

Two acetylations were carried out simultaneously in both cases using 100 parts of cellulose, each of which were mixed together with 550 parts of glacial acetic acid for 1 hour at 100° F. There was then added to each 1½ parts of sulfuric acid, and the mixture was cooled to 65° F. To each was then added while stirring 5 parts of sulfuric acid and 250 parts of 97% acetic anhydride, and the esterification was allowed to proceed to a temperature of 100° F. over a period of 1½ hours. In one of the acetylations the mixing was continued at 100–110° F. for 1⅓ hours, whereupon the esterification was completed. During this period, the amount of combined sulfur dropped from 1.9%, based on the cellulose, to .8%. In the second acetylation, 6.5 parts of sulfuric acid were added at the end of the 1½ hour reaction period. After 55 minutes more at 100° F., the esterification was completed and the combined sulfur content had decreased only from 1.8 to 1.4. In the case of the second acetylation batch, 5.2 parts of magnesium carbonate were added with 60% aqueous acetic acid to reduce the acetic acid concentration in the mass to 90%. In the case of the first acetylation, no magnesium carbonate (or other neutralizing agent) was added with the aqueous acetic acid. The masses in each case were allowed to stand at 100° F. until the cellulose acetate had an acetyl content of 39%. The ester from the first described reaction was found to have a filterability of only 15 lbs. per square foot, while the filterability of the cellulose acetate from the second acetylation procedure, in which additional sulfuric acid was added near the peak temperature, had a filterability of 40 lbs. per square foot.

We claim:

1. In a method of preparing cellulose acetate in which cellulose is esterified with and dissolves in a mixture of acetic anhydride, acetic acid and catalyst, where the reaction temperature rises but does not exceed a peak temperature within the range of 80–120° F., the steps which comprise initially mixing the cellulose with the acetylation mixture containing 2.5–8% of sulfuric acid based on the cellulose until the cellulose is substantially all acetylated, then adding further sulfuric acid in an amount ½–1½ times that employed in the initial step, thus promoting the esterification and dissolving of any unesterified cellulose fibers and inhibiting transesterification in the resulting ester.

2. In a method of preparing cellulose acetate in which cellulose is esterified with and dissolves in a mixture of acetic anhydride, acetic acid and catalyst, wherein the reaction temperature rises to but does not exceed a peak temperature within the range of 80–120° F., the steps which comprise initially mixing the cellulose with the acetylation mixture containing 2.5–8% of sulfuric acid based on the cellulose until the cellulose is substantially all acetylated, then adding further sulfuric acid in an amount ½–1½ times that employed in the initial step, thus promoting the esterification and dissolving of unesterified cellulose fibers and inhibiting transesterification in the resulting ester followed by adding to the mass dilute aqueous acetic acid containing a magnesium neutralizing agent in an amount only sufficient to substantially neutralize the amount of sulfuric acid which was added in the second step of the acetylation procedure, whereby the mass is converted to a hydrolyzing system and hydrolyzing the cellulose acetate to acetone solubility.

3. A method of preparing cellulose acetate which comprises acetylating cellulose with an esterification mixture comprising acetic acid, acetic anhydride and 6.5% of sulfuric acid based on the weight of the cellulose until the cellulose is substantially all acetylated and dissolved, then adding to the mass further sulfuric acid in an amount ½–1½ times that employed in the initial esterification step, thus promoting the esterification and dissolving of unesterified cellulose fibers and inhibiting transesterification in the resulting ester, then introducing hydrolysis conditions therein by adding aqueous acetic acid containing sufficient magnesium acetate to substantially neutralize the sulfuric acid added in the second step of the acetylation procedure and allowing the mass to stand under hydrolyzing conditions until an acetone soluble cellulose acetate is obtained.

References Cited in the file of this patent

UNITED STATES PATENTS

| | | |
|---|---|---|
| 1,546,679 | Sease | July 21, 1925 |
| 2,143,332 | Sindl et al. | Jan. 10, 1939 |
| 2,259,462 | Fletcher | Oct. 21, 1941 |
| 2,526,761 | Milbrada | Oct. 24, 1950 |
| 2,582,009 | Crane | Jan. 8, 1952 |
| 2,622,079 | Crane | Dec. 16, 1952 |